United States Patent
Rajadurai et al.

(10) Patent No.: US 9,037,112 B2
(45) Date of Patent: May 19, 2015

(54) METHOD AND SYSTEM FOR SECURED REMOTE PROVISIONING OF A UNIVERSAL INTEGRATED CIRCUIT CARD OF A USER EQUIPMENT

(75) Inventors: Rajavelsamy Rajadurai, Bangalore (IN); Han Na Lim, Seoul (KR); Kyung Joo Suh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 308 days.

(21) Appl. No.: 13/635,309

(22) PCT Filed: Mar. 15, 2011

(86) PCT No.: PCT/KR2011/001794
§ 371 (c)(1),
(2), (4) Date: Sep. 14, 2012

(87) PCT Pub. No.: WO2011/115407
PCT Pub. Date: Sep. 22, 2011

(65) Prior Publication Data
US 2013/0012168 A1  Jan. 10, 2013

(30) Foreign Application Priority Data
Mar. 15, 2010 (IN) .............................. 670/CHE/2010

(51) Int. Cl.
*H04M 1/66* (2006.01)
*H04W 12/04* (2009.01)
(Continued)

(52) U.S. Cl.
CPC ............. *H04W 12/04* (2013.01); *H04L 9/0822* (2013.01); *H04W 8/265* (2013.01); *H04L 2209/80* (2013.01); *H04W 92/08* (2013.01); *H04W 12/06* (2013.01)

(58) Field of Classification Search
CPC ..... H04W 12/02; H04W 12/04; H04W 12/06; H04W 8/265; H04L 63/08; H04L 9/0822
USPC ........ 455/410, 411; 380/270; 713/168; 726/3
See application file for complete search history.

(56) References Cited

U.S. PATENT DOCUMENTS

| 2007/0157022 A1 | 7/2007 | Blom et al. |
| 2009/0125996 A1 | 5/2009 | Guccione et al. |

(Continued)

OTHER PUBLICATIONS

3GPP TR 33.812 V9.0.0, 3rd Generation Partnership Project; Technical Specification Group Services and System Aspects; Feasibility Study on the Security Aspects of Remote Provisioning and Change of Subscription for M2M Equipment; (Release 9) Dec. 31, 2009.

*Primary Examiner* — Wayne Cai
(74) *Attorney, Agent, or Firm* — Jefferson IP Law, LLP (57) ABSTRACT

The present invention provides a method and system for secured remote provisioning of a universal integrated circuit card of a user equipment. A system includes a user equipment for initiating a request for remote provisioning of an universal integrated circuit card (UICC) in the user equipment, where the request for remote provisioning includes a machine identifier (MID) associated with the user equipment and a public land mobile network (PLMN) identifier (ID) associated with an network operator. The system also includes at least one shared key management server for dynamically generating security keys and an operator shared key using the security keys, the MID. Moreover, the system includes an operator network for generating a subscription key using the operator shared key and an international mobile subscriber identity (IMSI), and provisioning the IMSI in a secured manner to the UICC of the user equipment using the security keys.

36 Claims, 7 Drawing Sheets (51) Int. Cl.

*H04L 9/08* (2006.01)
*H04W 8/26* (2009.01)
*H04W 92/08* (2009.01)
*H04W 12/06* (2009.01)

(56) References Cited

U.S. PATENT DOCUMENTS

2010/0054472 A1* 3/2010 Barany et al. ............... 380/270
2012/0231760 A1* 9/2012 Zhu et al. .................. 455/404.1

* cited by examiner

METHOD AND SYSTEM FOR SECURED REMOTE PROVISIONING OF A UNIVERSAL INTEGRATED CIRCUIT CARD OF A USER EQUIPMENT

TECHNICAL FIELD

The present invention relates to the field of wireless communication, and more particularly relates to provisioning of an universal integrated circuit card of a user equipment.

BACKGROUND ART

Recent developments in Machine-to-Machine (M2M) applications has given rise to the possibility of having a universal integrated circuit card (UICC) that is embedded in a communication device in such a way that the UICC is not easily accessible or replaceable. The ability to change network subscriptions on such devices becomes problematic, thus necessitating mechanisms for securely and remotely provisioning access credentials on these embedded UICCs (eUICC) and managing subscription changes from one network operator to another. These mechanisms shall take into account that the change of subscription may involve provisioning of a new eUICC network access application as well as operator specific applications. Any changes must preserve the industry and end-user benefits that the non-embedded UICC provides today for GSM, 3GPP, 3GPP2 and other systems employing it, particularly in terms of security, flexibility in business relationships, logistics, and end-user experience.

DISCLOSURE OF INVENTION

Solution to Problem

The present invention provides a method and system for secured remote provisioning of a universal integrated circuit card of a user equipment. In one aspect, a method of secured remote provisioning of a universal integrated circuit card (UICC) of a user equipment includes generating a request for remote provisioning of an UICC of a user equipment remotely located from an operator network, where the request for remote provisioning includes a machine identifier (MID) associated with the user equipment and a public land mobile network (PLMN) identifier (ID) associated with an network operator.

The method further includes providing the request for remote provisioning to an associated one of shared key management servers by the operator network based on the MID. Also, the method includes dynamically generating security keys and an operator shared key using the security keys by the associated one of the shared key management servers based on the MID. Furthermore, the method includes generating a subscription key using the operator shared key and an international mobile subscriber identity (IMSI). Moreover, the method includes provisioning the IMSI in a secured manner to the UICC of the user equipment using the security keys by the operator network.

In another aspect, a non-transitory computer-readable storage medium having instructions stored therein, that when executed by a remote provisioning system, result in performing a method described above.

In yet another aspect, a system includes a user equipment for initiating a request for remote provisioning of an universal integrated circuit card (UICC) in the user equipment, where the request for remote provisioning includes a machine identifier (MID) associated with the user equipment and a public land mobile network (PLMN) identifier (ID) associated with an network operator. The system also includes at least one shared key management server for dynamically generating security keys and an operator shared key using the security keys, the MID. Moreover, the system includes an operator network for generating a subscription key using the operator shared key and an international mobile subscriber identity (IMSI) and provisioning the IMSI in a secured manner to the UICC of the user equipment using the security keys.

Other features of the embodiments will be apparent from the accompanying drawings and from the detailed description that follows.

The drawings described herein are for illustration purposes only and are not intended to limit the scope of the present disclosure in any way.

Mode for the Invention

The present invention provides a method and system for secured remote provisioning of a universal integrated circuit card of a user equipment. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

Figure 1:
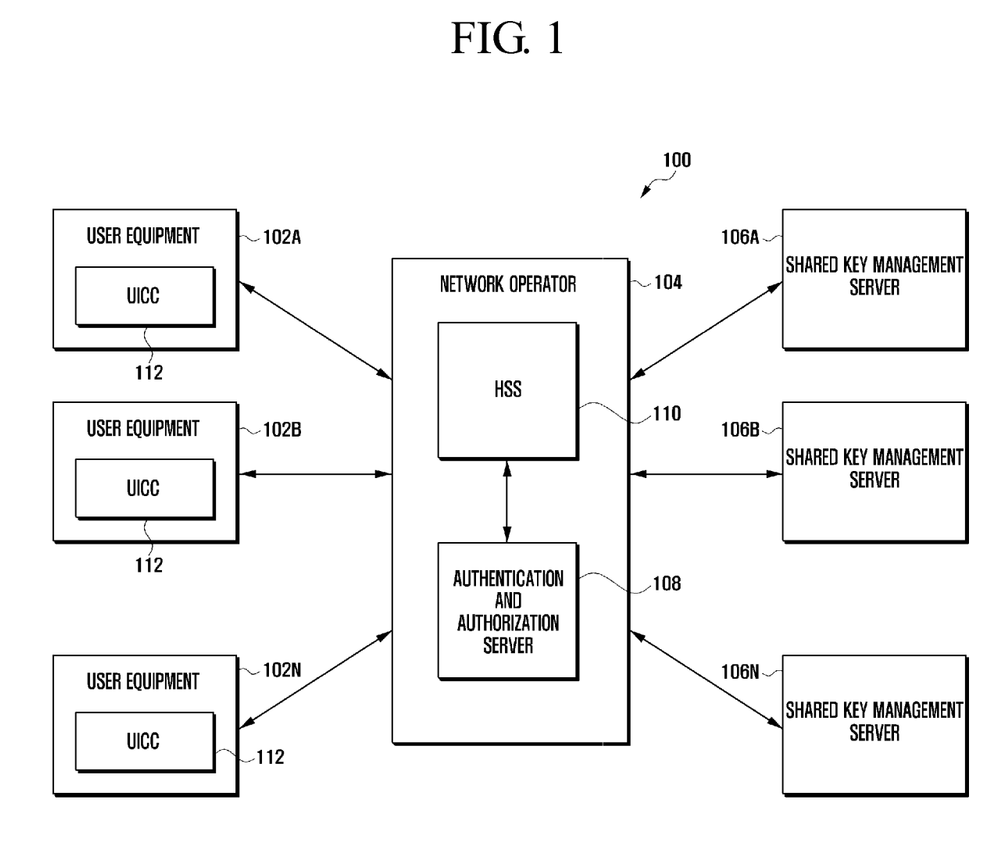
FIG. 1 illustrates a block diagram of a remote provisioning system for secured remote provisioning of an universal integrated circuit card (UICC) in a user equipment, according to one embodiment.

FIG. 1 illustrates a block diagram of a remote provisioning system 100 for secured remote provisioning of an universal integrated circuit card (UICC) in a user equipment, according to one embodiment. In FIG. 1, the remote provisioning system 100 includes a plurality of user equipments 102A-N, a network operator 104, and a plurality of shared key management servers 106A-N. The operator network 104 includes an authentication and authorization server 108, and a home subscriber server 110.

The user equipments 102A-N may include machine to machine communication devices or consumer equipments integrated with a universal integrated circuit card (UICC) 112 for communication with the network operator 104. The shared key management servers 106A-N may be vendors of the UICC 112 or manufactures of the user equipments 102A-N embedded with the UICC 112.

When installed for a first time, the UICC 112 installed in each of the user equipments 102A-N includes a private key infrastructure (PKI) (including an UE certificate, and a root certificate) or a vendor shared key, a machine identifier, security capabilities, and storage space for storing provisioning data. It can be noted that, each of the user equipments 102A-N includes the UICC 112 without the provisioning data of the network operator. The provisioning data may include international mobile subscriber identifier (IMSI), a security profile selected by the network operator, and a subscription key. The security profile contains a security algorithm (e.g., AES, SNOW 3G, MILENAGE, the like), supported modes of the security algorithm, and a key length.

In one embodiment, each of the user equipments 102A-N is remotely provisioned with provisioning data when the user equipments 102A-N are powered on for the first time. In an alternate embodiment, the UICC 112 in the user equipments 102A-N is remotely provisioned in a secure manner when there is a change in a network operator.

For the purpose of illustration, consider that the user equipment 102A is manufactured by a manufacturer 'A' and the manufacturer 'A' employs the shared key management server 106A to enable remote provisioning of the UICC 112 in the user equipment 102A via the operator network 104. When the user equipment 102A is powered on for the first time and the user equipment 102A wants to access services provided by the operator network 104, then the user equipment 102A initiates a request for remote provisioning of the UICC 112 to the operator network 104. The request for remote provisioning includes the MID and a public land mobile network (PLMN) identifier (ID) of the operator network 104. The authentication and authorization server 108 identifies a shared key management server associated with the user equipment 102A based on the MID. Accordingly, the server 108 provides the request for remote provisioning to the shared key management server 106A.

The shared key management server 106A generates authentication vectors, security keys (e.g., ciphering key (CK), and integrity protection key (IK)), an operator shared key using the security keys (CK and IK) and other parameters for mutual authentication based on the MID. The shared key management server 106A provides the operator shared key to the HSS 110 via the server 108. Alternatively, the operator shared key may be generated at the authentication and authorization server 108 using the security keys. The HSS 110 then generates an international mobile subscriber identity, a random number (Nonce), and a subscription key using the operator shared key and selects a security profile upon authenticating the user equipment 102A by the authentication and authorization server 108.

Accordingly, the authentication and authorization server 108 securely provisions the UICC 112 in the user equipment 102A with the IMSI, the selected security profile, and the random number using the security keys. Then, the user equipment 102A generates a subscription key using the operator shared key and the random number and stores the IMSI assigned by the network operator along with security profile and subscription key and uses the IMSI for establishing communication sessions with the operator network 104. One skilled in the art will realize that the subscription key is derived in the UICC 112 and the HSS 110 using the operator shared key, thereby avoiding the key assignment over the air.

The detailed process of secured remote provisioning of the UICC 112 is explained in greater detail in description that follows.

Figure 2A:
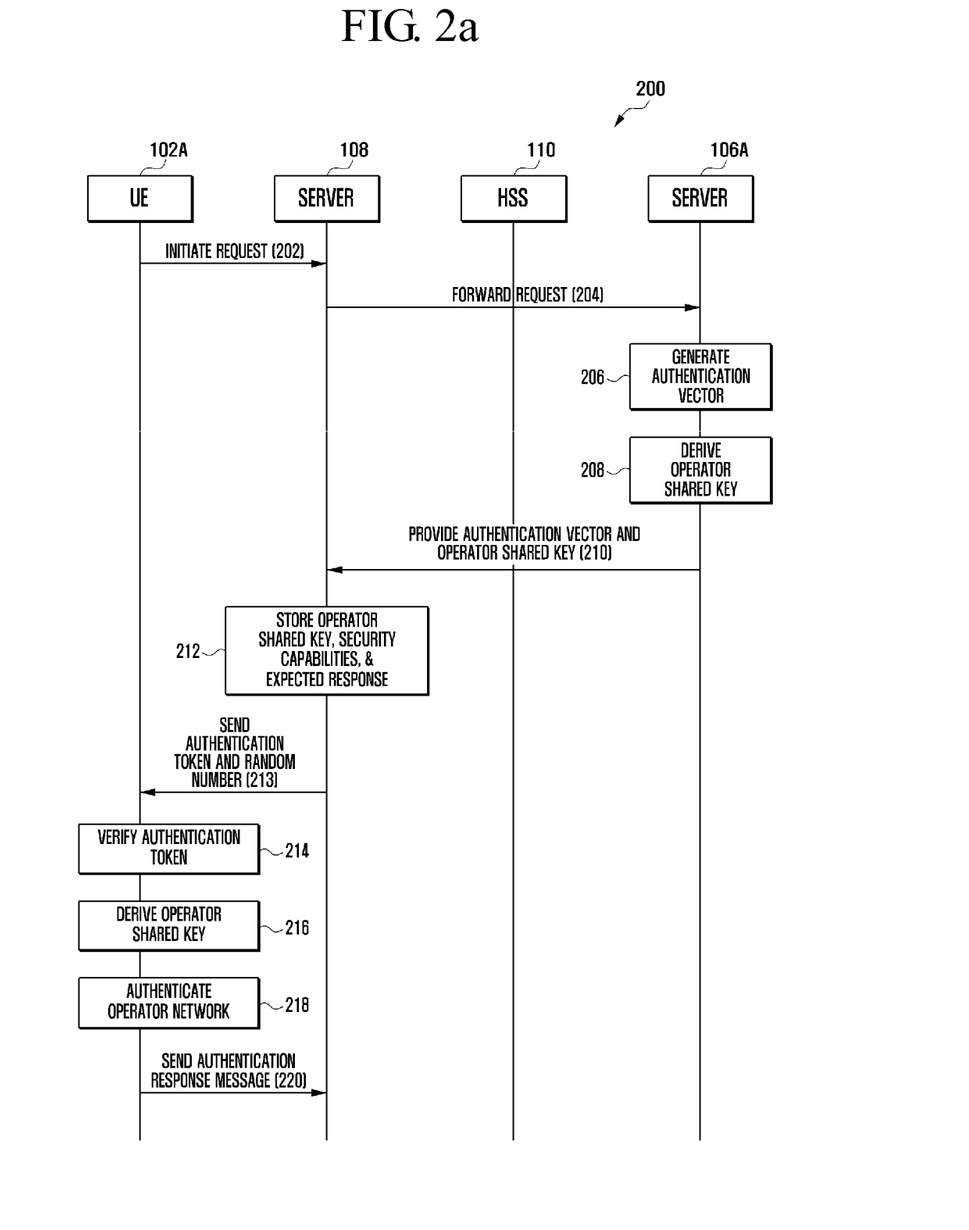
FIGS. 2a and 2b are flow diagrams illustrating an exemplary method of secured remote provisioning of the UICC in the user equipment, according to one embodiment.
Figure 2B:
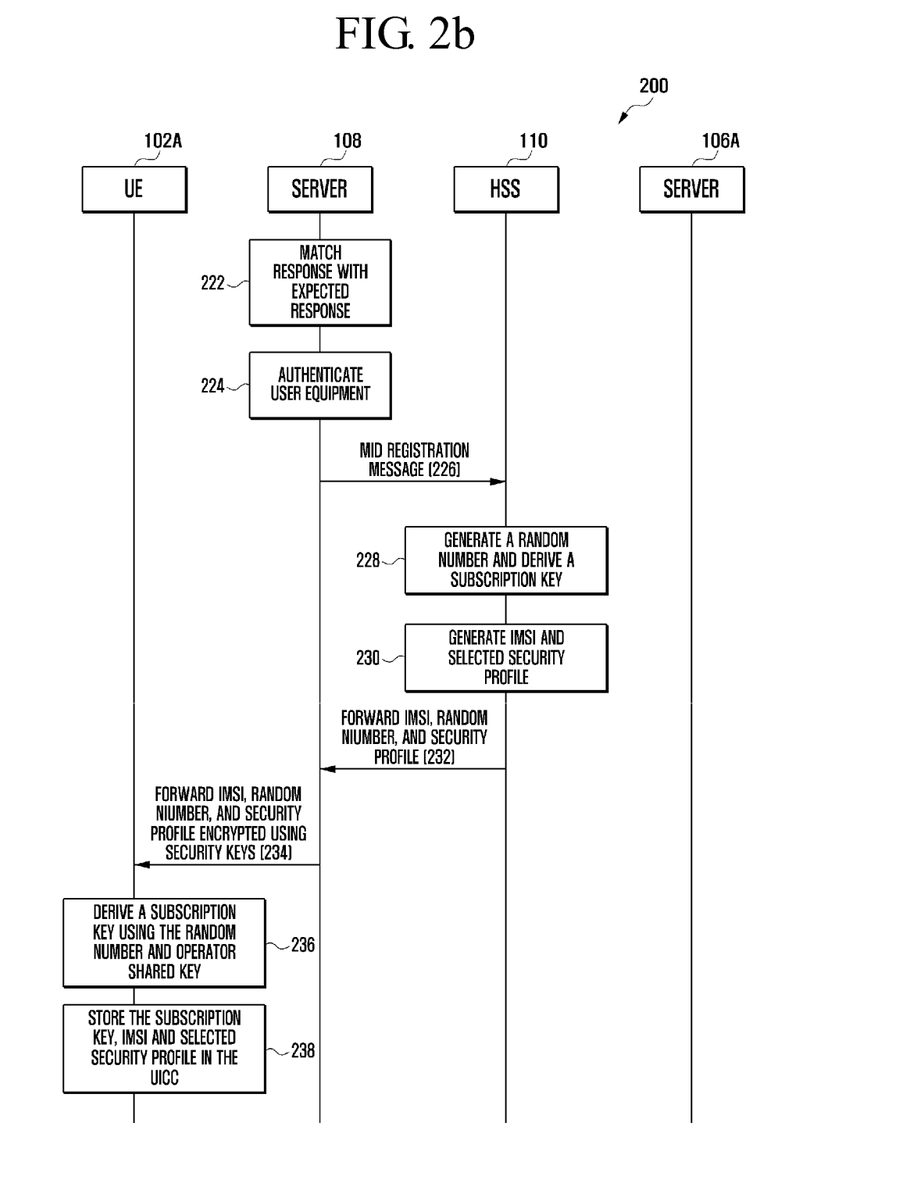

FIGS. 2a and 2b are flow diagrams 200 illustrating an exemplary method of secured remote provisioning of the UICC 112 in the user equipment 102A, according to one embodiment. At step 202, the user equipment 102A initiates a request for remote provisioning of the UICC 112. At step 204, the authentication and authorization server 104 forwards the request for remote provisioning along with a network type to the shared key management server 106A based on the MID. At step 206, the shared key management server 106A generates an authentication vector based on the request for remote provisioning received from the user equipment 102A. The authentication vector includes an authentication token, a random number, response expected from the user equipment 102A. At step 208, the shared key management server 106A derives an operator shared key using the security keys (ciphering key (CK), and integrity protection key (IK)) based on the MID.

At step 210, the shared key management server 106A provides the authentication token, the random number, the operator shared key, security capabilities, the expected response, and the security keys to the authentication and authorization server 108. At step 212, the authentication and authorization server 108 stores the operator shared key, the security capabilities, the expected response, and the security keys. At step 213, the authentication and authorization server 108 forwards the MID, the authentication token and the random number to the user equipment 102A. At step 214, the user equipment 102A verifies the authentication token using a vendor shared key. At step 216, the user equipment 102A derives security keys and an operator shared key using the security keys upon successful verification of the authentication token.

The shared key management server 106A may pre-store a list of operator shared keys and associated index values in the UICC 112 (during manufacturing phase). This enables the shared key management server 106A to select different keys for different network operator. In such case, the shared key management server 106A selects an operator shared key along with the associated index value from the list of operator shared keys (at step 208). Then, the shared key management server 106A shares the selected operator shared key and associated index value with the authentication and authorization server 108. Accordingly, the authentication and authorization server 108 provides the index value associated with the selected operator shared key to the user equipment 102A such that the user equipment 102A selects a corresponding operator shared key from the list of operator shared keys based on the index value during authentication phase.

At step 218, the user equipment 102A authenticates the network operator based on the authentication token and the random number. At step 220, the user equipment 102A generates and forwards an authentication response message including a response and the MID to the authentication and authorization server 108. At step 222, the authentication and authorization server 108 matches the response with the response expected from the user equipment 102A. At step 224, the authentication and authorization server 108 authenticates the user equipment 102A if the response matches with the expected response. At step 226, the authentication and authorization server 108 sends a MID registration message including the operator shared key, the security capabilities, and the MID to the HSS 110.

At step 228, the HSS 110 derives a subscription key associated with the registration of the user equipment 102A using the operator shared key, and a random number. At step 230, the HSS 110 generates IMSI for the user equipment 102A using the subscription key and selects a security profile from the security capabilities. At step 232, the authentication and authorization server 108 may encrypt the IMSI, the random number, and security profile associated with the user equipment 102A using the security keys.

At step 234, the authentication and authorization server 108 provides the IMSI, the random number and the security profile to the user equipment 102A. At step 236, the user equipment 102A derives the subscription key using the operator shared key and the random number. At step 238, the user equipment 102A stores the subscription key and the IMSI along with the security profile in the storage space of the UICC 112.

Figure 3:
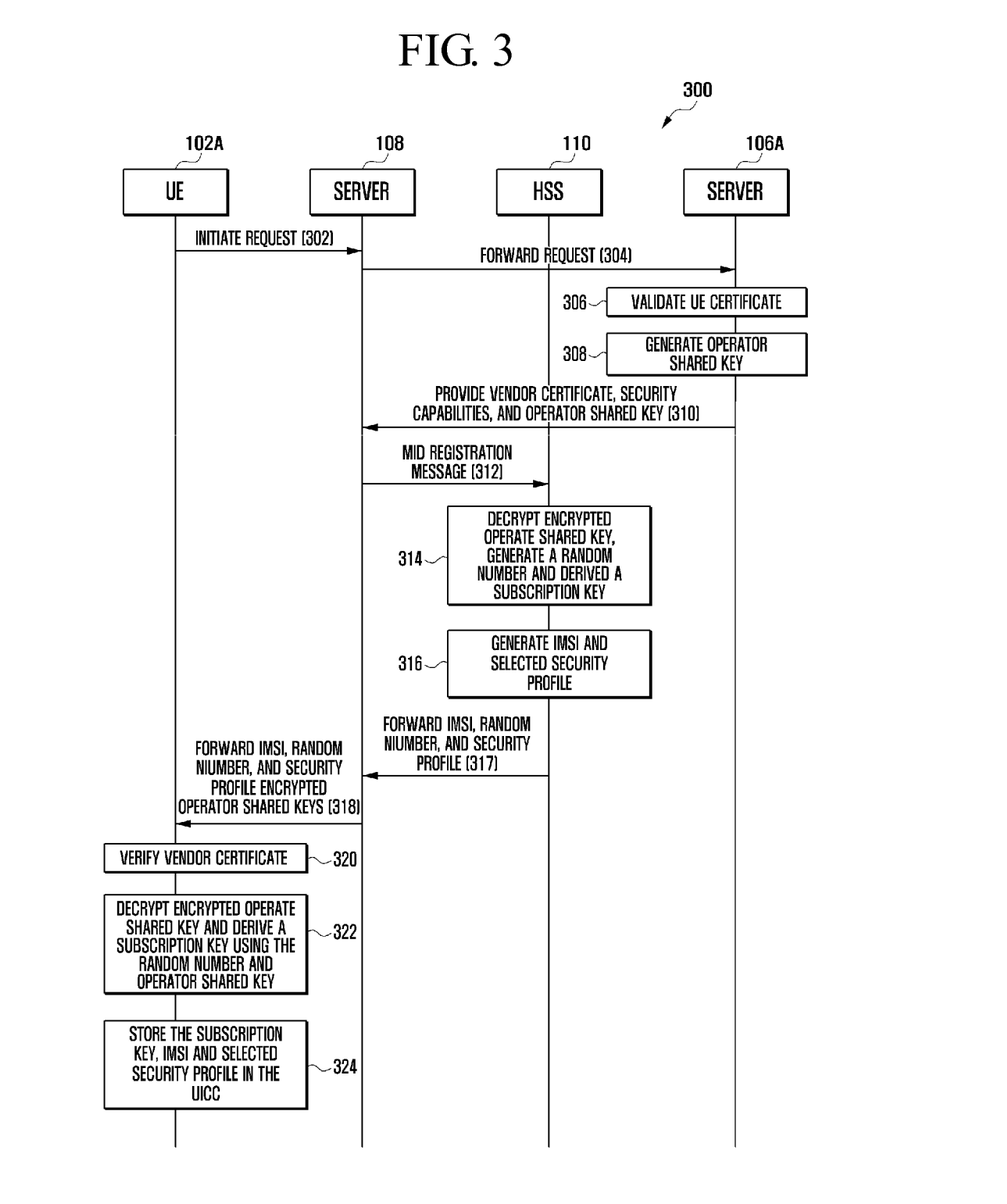
FIG. 3 is a flow diagram illustrating an exemplary method of secured remote provisioning of the UICC in the user equipment, according to another embodiment.

FIG. 3 is a flow diagram 300 illustrating an exemplary method of secured remote provisioning of the UICC 112 of the user equipment 102A, according to another embodiment. At step 302, the user equipment 102A initiates a request for remote provisioning of the UICC 112. The request includes MID, PLMN ID, and UE certificate. At step 304, the authentication and authorization server 104 forwards the request for remote provisioning along with a network type to the shared key management server 106A based on the MID. At step 306, the shared key management server 106A verifies and validates the UE certificate in the request for remote provisioning received from the user equipment 102A. At step 308, the shared key management server 106A generates an operator shared key. At step 310, the shared key management server 106A provides the operator shared key, security capabilities, a shared key management server certificate to the authentication and authorization server 108. In one embodiment, the shared key management server 106A encrypts the operator shared key using a public key associated with the user equipment 106A and a public key associated with the HSS 110 respectively.

The shared key management server 106A may pre-store a list of operator shared keys and associated index values in the UICC 112 (during manufacturing phase). This enables the shared key management server 106A to select different keys for different network operator. In such case, the shared key management server 106A selects an operator shared key along with the associated index value from the list of operator shared keys (at step 308). Then, the shared key management server 106A shares the selected operator shared key and associated index value with the authentication and authorization server 108. Accordingly, the authentication and authorization server 108 provides the index value associated with the selected operator shared key to the user equipment 102A such that the user equipment 102A selects a corresponding operator shared key from the list of operator shared keys based on the index value during IMSI assignment.

At step 312, the authentication and authorization server 108 sends a MID registration message including the encrypted operator shared key, the security capabilities, and the MID to the HSS 110. At step 314, the HSS 110 decrypts the encrypted operator shared key, generates a random number, and derives a subscription key using the operator shared key. At step 316, the HSS 110 generates an IMSI for the user equipment 102A using the subscription key and selects a security profile from the security capabilities and provides the same to the authentication and authorization server 108 (step 317).

At step 318, the authentication and authorization server 108 provides the IMSI, the random number, the security profile, the encrypted operator shared key, and the shared key management server certificate to the user equipment 102A via a secured channel. At step 320, the user equipment 102A verifies the shared key management server certificate using the root certificate in the UICC 112. Upon successful verification, at step 322, the user equipment 102A decrypts the encrypted operator shared key and derives the subscription key using the decrypted operator shared key and the random number. At step 324, the user equipment 102A stores the subscription key and the IMSI along with the security profile in the storage space of the UICC 112.

Figure 4:
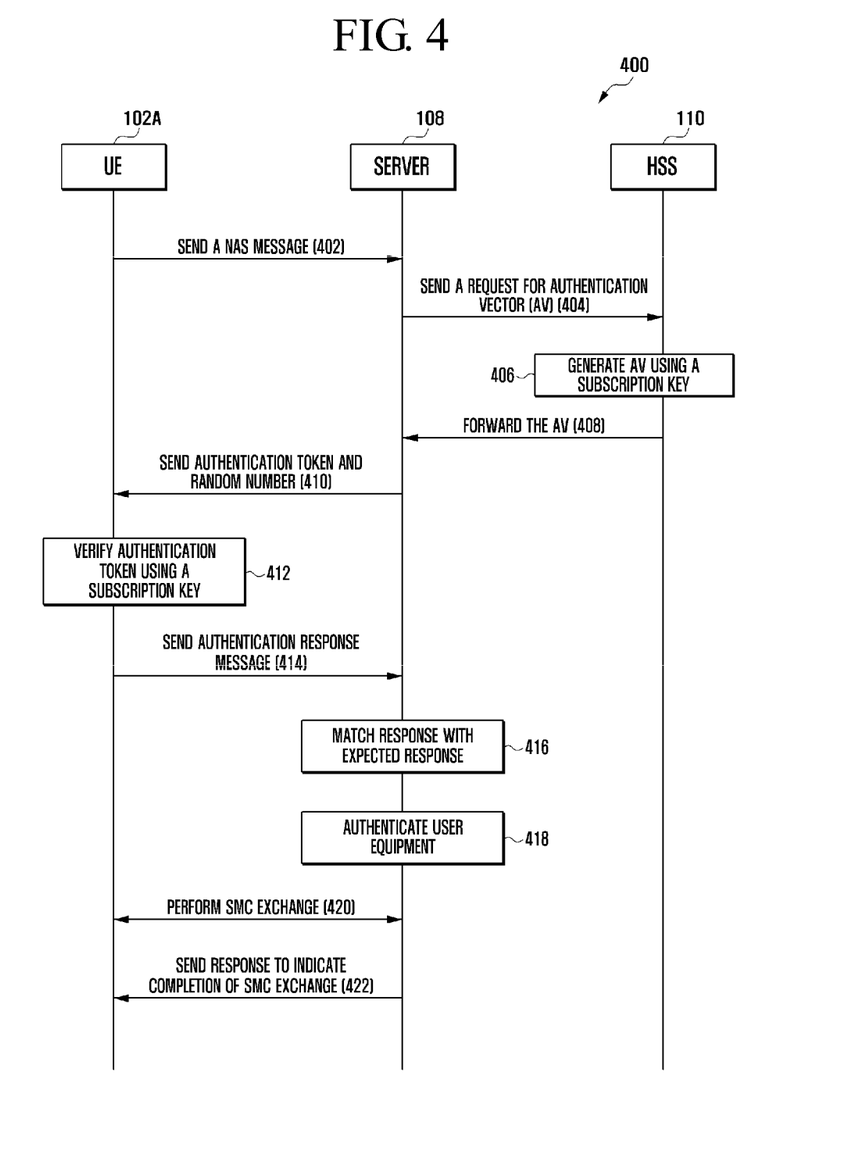
FIG. 4 is a flow diagram illustrating an exemplary method of establishing a communication session with the operator network using an international mobile subscriber identifier (IMSI) assigned to the user equipment, according to one embodiment.

FIG. 4 is a flow diagram 400 illustrating an exemplary method of establishing a communication session with the operator network using the IMSI assigned to the user equipment 102A, according to one embodiment. At step 402, the user equipment 102A sends a non-access stratum message including the assigned IMSI to the operator network 104. At step 404, the authentication and authorization server 108 requests the HSS 110 for an authentication vector to authenticate the user equipment 102A. At step 406, the HSS 110 generates the authentication vector using the subscription key. At step 408, the HSS 110 provides the authentication vector to the authentication and authorization server 108.

At step 410, the authentication and authorization server 108 sends a random number and authentication token in the authentication vector to the user equipment 102A for authentication. At step 412, the user equipment 102A verifies the authentication token using a subscription key. At step 414, the user equipment 102A generates and forwards an authentication response message including a response and associated MID to the authentication and authorization server 108. At step 416, the authentication and authorization server 108 matches the response with a response expected from the user equipment 102A. At step 418, the authentication and authorization server 108 authenticates the user equipment 102A if the response matches with the expected response.

At step 420, a security mode command (SMC) exchange is performed between the user equipment 102A and the operator network 104. At step 422, the operator network 104 sends a response to the user equipment 102A upon successful SMC exchange.

Figure 5:
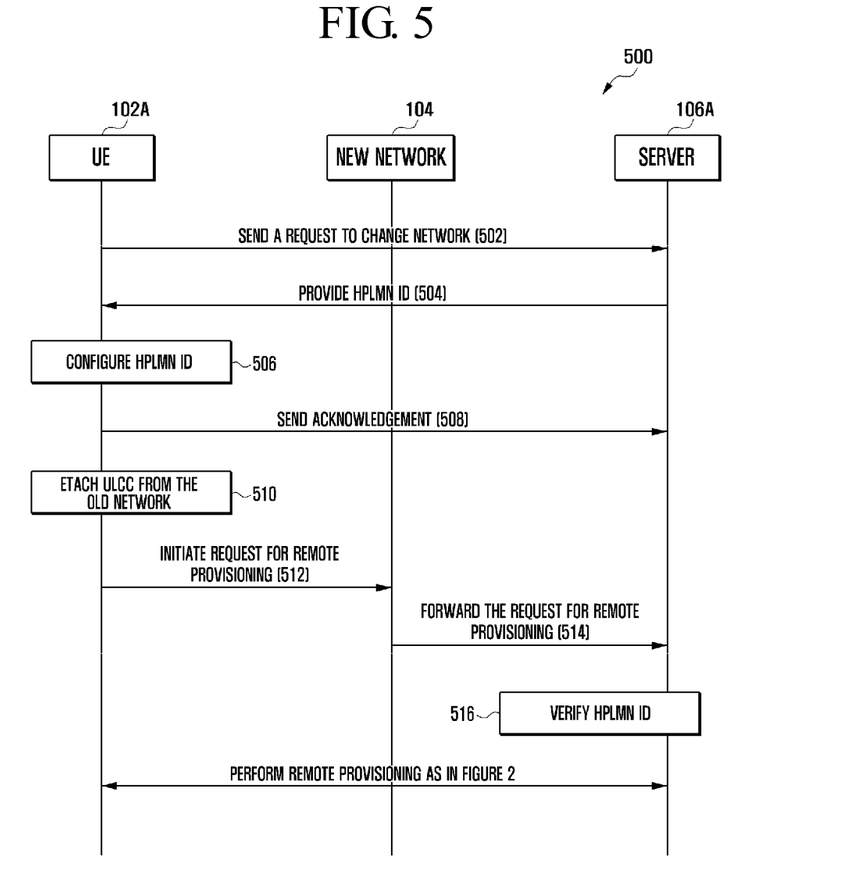
FIG. 5 is a flow diagram illustrating an exemplary method of changing a network operator and initiating secured remote provisioning of the UICC upon change of network operator, according to one embodiment.

FIG. 5 is a flow diagram 500 illustrating an exemplary method of changing a network operator and initiating secured remote provisioning of the UICC upon change of network operator, according to one embodiment. At step 502, the user equipment 102A request for a change in network operator to the shared key management server 106A. At step 504, the shared key management server 106A sends a home PLMN ID associated with a new operator to the user equipment 102A. At step 506, the user equipment 102A configures the HPLMN ID in the UICC 112 of the user equipment 102A. At step 508, the user equipment 102A sends an acknowledgement to the shared key management server 106A that the HPLMN ID is configured.

At step 510, the user equipment 102A detaches the UICC 112 from the current operator network 104. At step 512, the user equipment 102A initiates a request for remote provisioning of the UICC 112 to the new operator network. At step 514, the new operator network 104 forwards the request for remote provisioning including the MID and HPLMN ID to the shared key management server 106A. At step 516, the shared key management server 106A verifies the HPLMN ID in the request for remote provisioning matches with the HPLMN ID of the new operator network 104. if match is found, the remote provisioning of the UICC 112 is performed via the new operator network 104 as described in FIGS. 2a, 2b and 3.

Moreover, in one embodiment, a non-transitory computer-readable storage medium having instructions stored therein, that when executed by the remote provisioning system 100, result in performing the method described in FIGS. 2a through 5.

Figure 6:
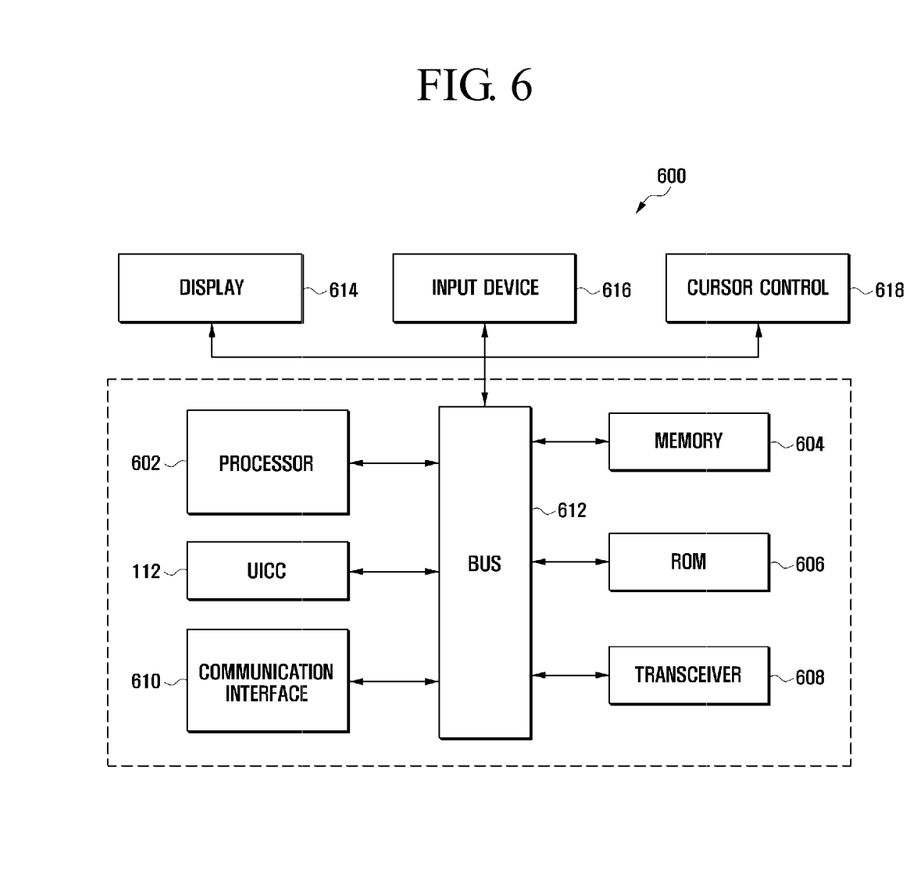
FIG. 6 is a block diagram of a user equipment showing various components for implementing embodiments of the present subject matter.

FIG. 6 is a block diagram of a user equipment 102A showing various components for implementing embodiments of the present subject matter. In FIG. 6, the user equipment 102A includes the UICC 112, a processor 602, memory 604, a read only memory (ROM) 606, a transceiver 608, a bus 610, a communication interface 612, a display 614, an input device 616, and a cursor control 618.

The UICC 112 is a smart card capable of storing provisioning data and SIM application. The UICC 112 primarily includes a private key infrastructure (PKI) (including a UE certificate, and a root certificate) or a vendor shared key, a machine identifier, security capabilities, and storage space for storing provisioning data. The processor 602, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 602 may also include embedded controllers, such as generic or programmable logic devices or arrays, application specific integrated circuits, single-chip computers, smart cards, and the like.

The memory 604 and the ROM 606 may be volatile memory and non-volatile memory. The memory 604 includes instructions temporarily stored therein to initiate a request for remote provisioning of the UICC 112 and receive provisioning data from the operator network 104, according to the embodiments of the present subject matter. A variety of computer-readable storage media may be stored in and accessed from the memory elements. Memory elements may include any suitable memory device(s) for storing data and machine-readable instructions, such as read only memory, random access memory, erasable programmable read only memory, electrically erasable programmable read only memory, hard drive, removable media drive for handling memory cards, Memory Sticks™, and the like.

Embodiments of the present subject matter may be implemented in conjunction with modules, including functions, procedures, data structures, and application programs, for performing tasks, or defining abstract data types or low-level hardware contexts. Machine-readable instructions stored on any of the above-mentioned storage media may be executable by the processor 602. For example, a computer program may include machine-readable instructions capable of initiating a request for remote provisioning of the UICC 112 and receiving provisioning data from the operator network 104 according to the teachings and herein described embodiments of the present subject matter. In one embodiment, the program may be included on a storage medium and loaded from the storage medium to a hard drive in the non-volatile memory. The machine-readable instructions may cause the user equipment 102A to encode according to the various embodiments of the present subject matter.

The transceiver 608 may be capable of sending the request for remote provisioning and securely receiving provisioning data including IMSI from the operator network 104. The bus 610 acts as interconnect between various components of the user equipment 102A. The components such as communication interfaces 612, the display 614, the input device 616, and the cursor control 618 are well known to the person skilled in the art and hence the explanation is thereof omitted.

INDUSTRIAL APPLICABILITY

The present embodiments have been described with reference to specific example embodiments, it will be evident that various modifications and changes may be made to these embodiments without departing from the broader spirit and scope of the various embodiments. Furthermore, the various devices, modules, selectors, estimators, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

The invention claimed is:

1. A method of a user equipment for secured remote provisioning of a universal integrated circuit card (UICC) of the user equipment, the method comprising:
   initiating a request for remote provisioning of the UICC of the user equipment remotely located from an operator network to a shared key management server via the operator network, wherein the request for remote provisioning includes a machine identifier (MID) associated with the user equipment and a public land mobile network (PLMN) identifier (ID) associated with an network operator;
   receiving authentication parameters from the operator network in response to the request for remote provisioning;
   sending an authentication response message to the operator network upon successful verification of authentication parameters;
   securely receiving security credentials from the operator network in response to the authentication response message; and
   generating a subscription key at the UICC based on the security credentials received from the operator network.

2. The method of claim 1, wherein the authentication parameters comprises an authentication token and random number.

3. The method of claim 2, wherein the security credentials comprises an international mobile subscriber identity (IMSI) assigned to the UICC, a security profile, and a random number.

4. The method of claim 3, wherein the sending of the authentication response message upon successful verification of authentication parameters, comprises:
   verifying the authentication parameters using a vendor shared key stored in the UICC by the shared key management server for authenticating the operator network;
   deriving security keys based on the authentication parameters and generating an operator shared key using the security keys;
   generating a response upon successful verification of the authentication parameters; and
   sending an authentication response message including the response to the operator network upon successful verification of the authentication parameters.

5. The method of claim 4, wherein the subscription key is generated based on the operator shared key, and the random number.

6. The method of claim 5, further comprising:
   storing the IMSI, the security profile, and the subscription key in the UICC.
7. The method of claim 1, wherein the request for remote provisioning is initiated upon powering on the user equipment.
8. The method of claim 1, further comprising:
   establishing one or more communication sessions with the network operator using the IMSI assigned to the UICC.
9. The method of claim 1, further comprising:
   requesting a change of network operator by the user equipment to the associated one of shared key management servers;
   receiving a home PLMN ID from the associated one of the shared key management servers;
   configuring the home PLMN ID in the UICC of the user equipment;
   detaching the UICC from the current operator network upon successful configuration of the home PLMN ID by the user equipment; and
   requesting remote provisioning of the UICC by the user equipment to another operator network associated with the home PLMN ID.
10. A method of a shared key management server for secured remote provisioning of a universal integrated circuit card (UICC) of the user equipment, the method comprising:
    receiving a request for remote provisioning of the UICC in the user equipment, wherein the request for remote provisioning includes a machine identifier (MID) associated with the user equipment and a public land mobile network (PLMN) identifier (ID) associated with an network operator; and
    dynamically generating security keys and an operator shared key using the security keys by the associated one of the shared key management servers based on the MID,
    wherein the security keys are used to provision an international mobile subscriber identity (IMSI) in a secured manner to the UICC of the user equipment.
11. The method of claim 10, wherein the dynamically generating of the security keys and the operator shared key using the security keys by the associated one of the shared key management servers based on the MID comprises:
    generating an authentication vector based on the request for remote provisioning received from the user equipment, wherein the authentication vector comprises an authentication token, a random number, expected response, and security keys;
    deriving the operator shared key based on the security keys, and the MID; and
    providing the authentication token, the random number, the operator shared key, security capabilities, response expected from the user equipment, the security keys during authentication to the authentication and authorization server.
12. The method of claim 11, wherein the UICC in the user equipment comprises a pre-stored list of operator shared keys and associated index value.
13. The method of claim 12, wherein the dynamically generating of the security keys and the operator shared key using the security keys by the associated one of the shared key management servers based on the MID comprises:
    generating an authentication vector based on the request for remote provisioning received from the user equipment, wherein the authentication vector comprises an authentication token, a random number, expected response, and security keys;
    selecting an operator shared key and an associated index value from the list of operator shared keys; and
    providing the authentication token, the random number, the operator shared key, the associated index value, security capabilities, response expected from the user equipment, the security keys during authentication to the authentication and authorization server.
14. A method of a home subscriber server (HSS) for secured remote provisioning of a universal integrated circuit card (UICC) of the user equipment, the method comprising:
    receiving a machine identifier (MID) registration message from an authentication and authorization server, wherein the MID registration message includes an operator shared key, security capabilities, and an MID;
    generating a subscription key using the operator shared key and an international mobile subscriber identity (IMSI) by the operator network; and
    providing the IMSI, the random number, and the security profile associated with the user equipment upon successful registration of the UICC to the authentication and authorization server,
    wherein the IMSI is provisioned in a secured manner to the UICC of the user equipment using security keys generated by the associated one of the shared key management servers.
15. The method of claim 14, wherein generating of the subscription key using the operator shared key and the IMSI further comprises:
    generating a random number, and a subscription key associated with registration of the user equipment using the MID registration message; and
    generating an IMSI for the user equipment and selecting a security profile from the security capabilities.
16. A method of an authentication and authorization server for secured remote provisioning of a universal integrated circuit card (UICC) of the user equipment, the method comprising:
    receiving an authentication token, a random number, an operator shared key, security capabilities, response expected from the user equipment, the security keys during authentication from an associated one of shared key management servers;
    receiving a user authentication response message including a response and the machine identifier in response to the random number and the authentication token; and
    generating and sending a machine identifier (MID) registration message to a home subscriber server (HSS) of the operator network, wherein the MID registration message includes the operator shared key, the security capabilities, and the MID,
    wherein the MID registration message is used to generate a random number, a subscription key and an international mobile subscriber identity (IMSI), and
    wherein the IMSI is provisioned in a secured manner to the UICC of the user equipment using the security keys.
17. The method of claim 16, wherein the generating of the MID registration message comprises:
    determining whether the response in the user authentication response message matches a response expected from the user equipment received from the associated one of the shared key management servers; and
    authenticating the user equipment if the response matches the response expected from the user equipment.
18. The method of claim 16, further comprising:
    encrypting the IMSI, the random number and the security profile associated with the user equipment using the security keys.

19. A user equipment for secured remote provisioning of a universal integrated circuit card (UICC) of the user equipment, the user equipment comprising:
- a transceiver configured to transmit and receive a signal; and
- a controller configured to initiate a request for remote provisioning of the UICC of the user equipment remotely located from an operator network to a shared key management server via the operator network, wherein the request for remote provisioning includes a machine identifier (MID) associated with the user equipment and a public land mobile network (PLMN) identifier (ID) associated with an network operator, to receive authentication parameters from the operator network in response to the request for remote provisioning, to send an authentication response message to the operator network upon successful verification of authentication parameters, securely to receive security credentials from the operator network in response to the authentication response message, and to generate a subscription key at the UICC based on the security credentials received from the operator network.

20. The user equipment of claim 19, wherein the authentication parameters comprises an authentication token and random number.

21. The user equipment of claim 20, wherein the security credentials comprises an international mobile subscriber identity (IMSI) assigned to the UICC, a security profile, and a random number.

22. The user equipment of claim 21, wherein the sending of the authentication response message upon successful verification of authentication parameters, comprises:
- verifying the authentication parameters using a vendor shared key stored in the UICC by the shared key management server for authenticating the operator network;
- deriving security keys based on the authentication parameters and generating an operator shared key using the security keys;
- generating a response upon successful verification of the authentication parameters; and
- sending an authentication response message including the response to the operator network upon successful verification of the authentication parameters.

23. The user equipment of claim 22, wherein the subscription key is generated based on the operator shared key, and the random number.

24. The user equipment of claim 23, wherein the controller is further configured to store the IMSI, the security profile, and the subscription key in the UICC.

25. The user equipment of claim 19, wherein the request for remote provisioning is initiated upon powering on the user equipment.

26. The user equipment of claim 19, wherein the controller is further configured to establish one or more communication sessions with the network operator using the IMSI assigned to the UICC.

27. The user equipment of claim 19, wherein the controller is further configured to request a change of network operator by the user equipment to the associated one of shared key management servers, to receive a home PLMN ID from the associated one of the shared key management servers, to configure the home PLMN ID in the UICC of the user equipment, to detach the UICC from the current operator network upon successful configuration of the home PLMN ID by the user equipment, and to request remote provisioning of the UICC by the user equipment to another operator network associated with the home PLMN ID.

28. A shared key management server for secured remote provisioning of a universal integrated circuit card (UICC) of the user equipment, the shared key management server comprising:
- a transceiver configured to transmit and receive a signal; and
- a controller configured to receive a request for remote provisioning of the UICC in the user equipment, wherein the request for remote provisioning includes a machine identifier (MID) associated with the user equipment and a public land mobile network (PLMN) identifier (ID) associated with an network operator, and dynamically to generate security keys and an operator shared key using the security keys by the associated one of the shared key management servers based on the MID,
- wherein the security keys are used to provision an international mobile subscriber identity (IMSI) in a secured manner to the UICC of the user equipment.

29. The shared key management server of claim 28, wherein the dynamically generating of the security keys and the operator shared key using the security keys by the associated one of the shared key management servers based on the MID comprises:
- generating an authentication vector based on the request for remote provisioning received from the user equipment, wherein the authentication vector comprises an authentication token, a random number, expected response, and security keys;
- deriving the operator shared key based on the security keys, and the MID; and
- providing the authentication token, the random number, the operator shared key, security capabilities, response expected from the user equipment, the security keys during authentication to the authentication and authorization server.

30. The shared key management server of claim 29, wherein the UICC in the user equipment comprises a pre-stored list of operator shared keys and associated index value.

31. The shared key management server of claim 30, wherein the dynamically generating of the security keys and the operator shared key using the security keys by the associated one of the shared key management servers based on the MID comprises:
- generating an authentication vector based on the request for remote provisioning received from the user equipment, wherein the authentication vector comprises an authentication token, a random number, expected response, and security keys;
- selecting an operator shared key and an associated index value from the list of operator shared keys; and
- providing the authentication token, the random number, the operator shared key, the associated index value, security capabilities, response expected from the user equipment, the security keys during authentication to the authentication and authorization server.

32. A home subscriber server (HSS) for secured remote provisioning of a universal integrated circuit card (UICC) of the user equipment, the HSS comprising:
- a transceiver configured to transmit and receive a signal; and
- a controller configured to receive a machine identifier (MID) registration message from an authentication and authorization server, wherein the MID registration message includes an operator shared key, security capabilities, and an MID, to generate a subscription key using the operator shared key and an international mobile subscriber identity (IMSI) by the operator network, and to provide the IMSI, the random number, and the security profile associated with the user equipment upon successful registration of the UICC to the authentication and authorization server, wherein the IMSI is provisioned in a secured manner to the UICC of the user equipment using security keys generated by the associated one of the shared key management servers.

33. The HSS of claim 32, wherein the generating of the subscription key using the operator shared key and the IMSI further comprises:

generating a random number, and a subscription key associated with registration of the user equipment using the MID registration message; and generating an IMSI for the user equipment and selecting a security profile from the security capabilities.

34. An authentication and authorization server for secured remote provisioning of a universal integrated circuit card (UICC) of the user equipment, the authentication and authorization server comprising:

a transceiver configured to transmit and receive a signal; and a controller configured to receive an authentication token, a random number, an operator shared key, security capabilities, response expected from the user equipment, the security keys during authentication from an associated one of shared key management servers, to receive a user authentication response message including a response and the machine identifier in response to the random number and the authentication token, and to generate and send a machine identifier (MID) registration message to a home subscriber server (HSS) of the operator network, wherein the MID registration message includes the operator shared key, the security capabilities, and the MID, wherein the MID registration message is used to generate a random number, a subscription key and an international mobile subscriber identity (IMSI), wherein the IMSI is provisioned in a secured manner to the UICC of the user equipment using the security keys.

35. The authentication and authorization server of claim 34, wherein the generating of the MID registration message comprises:

determining whether the response in the user authentication response message matches a response expected from the user equipment received from the associated one of the shared key management servers; and authenticating the user equipment if the response matches the response expected from the user equipment.

36. The authentication and authorization server of claim 34, wherein the controller is further configured to encrypt the IMSI, the random number and the security profile associated with the user equipment using the security keys.

* * * * *